(12) United States Patent
Jiang et al.

(10) Patent No.: US 12,192,966 B2
(45) Date of Patent: Jan. 7, 2025

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 521 days.

(21) Appl. No.: 17/683,234

(22) Filed: Feb. 28, 2022

(65) Prior Publication Data

US 2022/0191834 A1 Jun. 16, 2022

Related U.S. Application Data

(63) Continuation of application No. PCT/CN2020/108650, filed on Aug. 12, 2020.

(30) Foreign Application Priority Data

Aug. 29, 2019 (CN) .......................... 201910808162.0

(51) Int. Cl.
*H04W 72/02* (2009.01)
*H04L 5/00* (2006.01)
(Continued)

(52) U.S. Cl.
CPC ............ *H04W 72/02* (2013.01); *H04L 5/005* (2013.01); *H04W 72/0446* (2013.01); *H04W 92/18* (2013.01)

(58) Field of Classification Search
None
See application file for complete search history.

(56) References Cited

U.S. PATENT DOCUMENTS 11,637,672 B2* 4/2023 Saito ................. H04W 72/0453
370/329
2019/0141726 A1* 5/2019 Wang ..................... H04W 76/10
(Continued)

FOREIGN PATENT DOCUMENTS

CN 110049558 A 7/2019
CN 110098902 A 8/2019
(Continued)

OTHER PUBLICATIONS

ISR received in application No. PCT/CN2020/108650 dated Nov. 13,2020.

*Primary Examiner* — Otis L Thompson, Jr.

(57) ABSTRACT

A method and device in a node for wireless communications. A first node firstly transmits a target signaling; and then transmits a first signaling and a second signaling; and transmits a first signal in a first radio resource set; the target signaling is used to determine a target reference signal; the first signaling and the second signaling are respectively used to indicate a first radio resource pool and a second radio resource pool; the type of multicarrier symbols comprised in the first radio resource pool is a first type; there is at least one of multicarrier symbols comprised in the second radio resource pool that is of a type other than the first type; the present disclosure, by transmitting a first signal on resources other than cellular link uplink resources, manages to enhance the chance of feedback information transmission in sidelink, thereby improving the spectrum of the sidelink transmission.

20 Claims, 5 Drawing Sheets

(51) Int. Cl.
*H04W 72/0446* (2023.01)
*H04W 92/18* (2009.01)

(56) References Cited

U.S. PATENT DOCUMENTS

| | | | |
|---|---|---|---|
| 2019/0190669 A1* | 6/2019 | Park | H04W 72/21 |
| 2019/0281588 A1* | 9/2019 | Zhang | H04B 7/0617 |
| 2020/0008178 A1* | 1/2020 | Zhang | H04W 72/0453 |
| 2020/0313933 A1* | 10/2020 | Chen | H04L 27/2613 |
| 2021/0014831 A1* | 1/2021 | Ryu | H04W 72/02 |
| 2021/0297202 A1* | 9/2021 | Liu | H04L 5/0092 |
| 2021/0400668 A1* | 12/2021 | Matsumura | H04L 5/003 |
| 2022/0039080 A1* | 2/2022 | Khoryaev | H04W 4/40 |
| 2022/0149924 A1* | 5/2022 | Zhang | H04W 72/1263 |
| 2022/0272728 A1* | 8/2022 | Liu | H04L 5/0094 |
| 2022/0322297 A1* | 10/2022 | Cha | H04L 5/0051 |
| 2022/0338301 A1* | 10/2022 | Park | H04W 4/40 |
| 2023/0379827 A1* | 11/2023 | Liu | H04W 52/0229 |
| 2024/0048324 A1* | 2/2024 | Li | H04L 5/0048 |

FOREIGN PATENT DOCUMENTS

| | | |
|---|---|---|
| CN | 110177397 A | 8/2019 |
| WO | 2018175709 A1 | 9/2018 |

\* cited by examiner

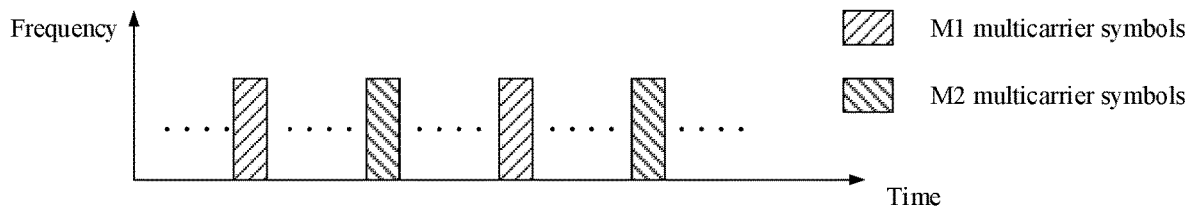
FIG. 6
| Format | Symbol Number in a Slot D: Downlink, U: Uplink, F: Flexible | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 44 | D | D | D | D | D | D | F | F | F | F | F | F | U | U |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
FIG. 7
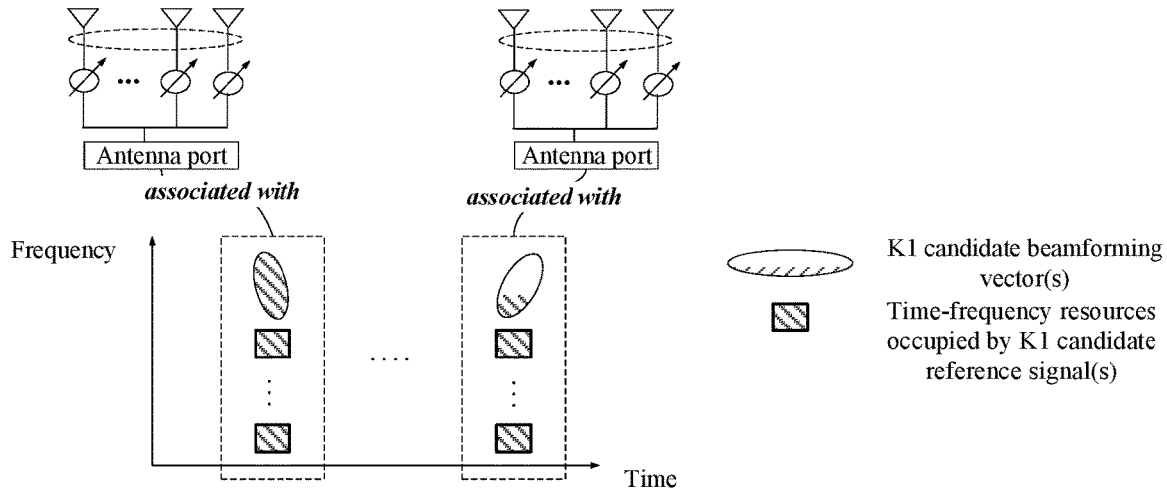
FIG. 8

METHOD AND DEVICE IN NODES USED FOR WIRELESS COMMUNICATION

CROSS REFERENCE TO RELATED APPLICATIONS

This application is the continuation of International Patent Application No. PCT/CN2020/108650, filed on Aug. 12, 2020, which claims the priority benefit of Chinese Patent Application No. 201910808162.0, filed on Aug. 29, 2019, the full disclosure of which is incorporated herein by reference.

BACKGROUND

Technical Field

The present disclosure relates to transmission methods and devices in wireless communication systems, and in particular to a sidelink-related transmission method and device in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP started its work of standards setting and studies around the NR framework. At present, the 3GPP has finished regulations of requirements targeting the 5G V2X traffics which are included in the TS 22.886. The 3GPP defined 4 typical Use Case Groups for the 5G V2X traffics, which are as follows: Vehicles Platooning, Extended Sensors, Advanced Driving and Remote Driving. And a study of V2X technologies based on NR was already initiated by the 3GPP at the RAN #80 Plenary.

SUMMARY

Compared with the existing Long-term Evolution (LIE) V2X system, NR V2X has a significant character of supporting both unicast and groupcast as well as Hybrid Automatic Repeat reQuest (HARQ) functions. The Physical Sidelink Feedback Channel (PSFCH) is introduced for a HARQ-Acknowledgement (HARQ-ACK) transmission in sidelink. According to conclusions drawn at the 3GPP RAN1 #96b conference, PSFCH resources can be periodically configured or pre-configured.

In Device to Device (D2D) communications and V2X communications under the traditional LTE-A, spectrum resources occupied by inter-terminal communications are usually uplink spectrum in a cellular link, hence in the scenario of Time Domain Duplex (TDD), the communications between terminals adopts the UL Subframes all the time. In a Release 15 NR system, the introduction of a Slot Format Indicator (SFI) contributes to a more flexible distribution of uplink and downlink Orthogonal Frequency Division Multiplexing (OFDM) symbols in a slot, therefore, it is necessary to discuss how to make full use of the properties of SFI in the NR scenarios to acquire more V2X resources.

To address the above problem, the present disclosure provides a solution. It should be noted that in the case of no conflict, the embodiments of a first node and the characteristics in the embodiments may be applied to a second node, and vice versa. In the meantime, it should be noted that in the case of no conflict, the embodiments of a first node and the characteristics in the embodiments may be applied to a third node, and vice versa. What's more, the embodiments in the present disclosure and the characteristics in the embodiments can be arbitrarily combined if there is no conflict.

The present disclosure provides a method in a first node for wireless communications, comprising:

transmitting a target signaling;

transmitting a first signaling and a second signaling; and transmitting a first signal in a first radio resource set;

herein, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, an advantage of the above method is that: the second radio resource pool comprises multicarrier symbols marked by "D" (i.e., Downlink) or "F" (i.e., Flexible) in the cellular link, when shared cellular link resources are transmitted by V2X, the above "D" or "F"-marked multicarrier symbols can also be used for V2X transmission, thus increasing the chance of V2X transmission, guaranteeing the V2X transmission performance.

In one embodiment, another advantage of the above method is that: a beam corresponding to the first reference signal is a beam that will influence the reception in the cellular link; by transmitting a target reference signal, the first node tells a receiver for the first signal that only when a transmission beam for the first signal, that is, a beam corresponding to the target reference signal, is different from a beam corresponding to the first reference signal can the first signal be transmitted on a symbol marked by "D" or "F"; the above method avoids interferences between V2X transmission and cellular link.

According to one aspect of the present disclosure, the target signaling is used to indicate K1 candidate reference signal(s), the target reference signal is one of the K1 candidate reference signal(s), where K1 is a positive integer.

In one embodiment, an advantage of the above method is that: the first node provides multiple beams for the second node in the present disclosure to choose from, i.e., corresponding to the K1 candidate reference signal(s), thus helping the second node select a better beam to receive the first signal.

According to one aspect of the present disclosure, the above method is characterized in comprising:

receiving K2 first-type radio signal(s);

herein, the K2 first-type radio signal(s) is (are respectively) associated with K2 first-type reference signal(s); the target reference signal is unrelated to any one of the K2 first-type reference signal(s); the first reference signal is related to at least one of the K2 first-type reference signal(s); a receiver for the first signal includes a second node, a transmitter for the K2 first-type radio signal(s) is a third node, the second node and the third node being non-co-located; K2 is a positive integer.

In one embodiment, an advantage of the above method is that: the first node receives the K2 first-type radio signal(s) from a third node to determine the target reference signal, thus ensuring that the transmission on beam(s) related to the target reference signal won't produce any interference to the downlink reception in cellular link.

According to one aspect of the present disclosure, the above method is characterized in comprising:

receiving a third signaling and a second signal;

herein, the third signaling comprises configuration information for the second signal, the first signal comprising feedback for the second signal.

In one embodiment, the above method is characterized in that: the third signaling is Sidelink Control Information (SCI) that schedules the second signal, thus, the first signal is feedback for the second signal; the purpose of the scheme is to increase the opportunity of transmission of the first signal, thereby avoiding the situation where the chance of transmitting the first signal is rare resulting from scarcity of uplink symbols marked by "U" in some slot in the system.

According to one aspect of the present disclosure, the above method is characterized in that the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

The present disclosure provides a method in a second node for wireless communications, comprising:

receiving a target signaling;

receiving a first signaling and a second signaling; and receiving a first signal in a first radio resource set;

herein, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

According to one aspect of the present disclosure, the target signaling is used to indicate K1 candidate reference signal(s), the target reference signal is one of the K1 candidate reference signal(s), where K1 is a positive integer.

According to one aspect of the present disclosure, the above method is characterized in that a transmitter for the first signal receives K2 first-type radio signal(s); the K2 first-type radio signal(s) is (are respectively) associated with K2 first-type reference signal(s); the target reference signal is unrelated to any one of the K2 first-type reference signal(s); the first reference signal is related to at least one of the K2 first-type reference signal(s); a transmitter for the K2 first-type radio signal(s) is a third node, the second node and the third node being non-co-located; K2 is a positive integer.

According to one aspect of the present disclosure, the above method is characterized in comprising:

transmitting a third signaling and a second signal;

herein, the third signaling comprises configuration information for the second signal, the first signal comprising feedback for the second signal.

According to one aspect of the present disclosure, the above method is characterized in that the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

The present disclosure provides a method in a third node for wireless communications, comprising:

transmitting K2 first-type radio signal(s);

herein, the K2 first-type radio signal(s) is (are respectively) associated with K2 first-type reference signal(s); a target reference signal is unrelated to any one of the K2 first-type reference signal(s); a first reference signal is related to at least one of the K2 first-type reference signal(s); a receiver for the K2 first-type radio signal(s) includes a first node, the first node firstly transmits a target signaling, and then transmits a first signaling and second signaling, and transmits a first signal in a first radio resource set; the target signaling is used to determine the target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with the first reference signal; when the first radio resource set belongs to the second radio resource pool, the first signal is associated with the target reference signal, the target reference signal being unrelated to the first reference signal; the first signal is transmitted in sidelink; M1 and M2 are both positive integers greater than 1; a receiver for the first signal includes a second node, the second node and the third node being non-co-located; K2 is a positive integer.

According to one aspect of the present disclosure, the target signaling is used to indicate K1 candidate reference signal(s), the target reference signal is one of the K1 candidate reference signal(s), where K1 is a positive integer.

According to one aspect of the present disclosure, the above method is characterized in that the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

The present disclosure provides a first node for wireless communications, comprising:

a first transceiver, transmitting a target signaling;

a first transmitter, transmitting a first signaling and a second signaling; and a second transceiver, transmitting a first signal in a first radio resource set;

herein, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

The present disclosure provides a second node for wireless communications, comprising:

a first receiver, receiving a target signaling;

a second receiver, receiving a first signaling and a second signaling; and a third transceiver, receiving a first signal in a first radio resource set;

herein, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

The present disclosure provides a third node for wireless communications, comprising:

a second transmitter, transmitting K2 first-type radio signal(s);

herein, the K2 first-type radio signal(s) is (are respectively) associated with K2 first-type reference signal(s); a target reference signal is unrelated to any one of the K2 first-type reference signal(s); a first reference signal is related to at least one of the K2 first-type reference signal(s); a receiver for the K2 first-type radio signal(s) includes a first node, the first node firstly transmits a target signaling, and then transmits a first signaling and second signaling, and transmits a first signal in a first radio resource set; the target signaling is used to determine the target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with the first reference signal; when the first radio resource set belongs to the second radio resource pool, the first signal is associated with the target reference signal, the target reference signal being unrelated to the first reference signal; the first signal is transmitted in sidelink; M1 and M2 are both positive integers greater than 1; a receiver for the first signal includes a second node, the second node and the third node being non-co-located; K2 is a positive integer.

In one embodiment, compared with the prior art, the present disclosure is advantageous in the following aspects:

the second radio resource pool comprises multicarrier symbols marked by "D" or "F" in the cellular link, when shared cellular link resources are transmitted by V2X, the above "D" or "F"-marked multicarrier symbols can also be used for V2X transmission, thus increasing the chance of V2X transmission, guaranteeing the V2X transmission performance;

a beam corresponding to the first reference signal is a beam that will influence the reception in the cellular link; by transmitting a target reference signal, the first node tells a receiver for the first signal that only when a transmission beam for the first signal, that is, a beam corresponding to the target reference signal, is different from a beam corresponding to the first reference signal can the first signal be transmitted on a symbol marked by "D" or "F"; the above method avoids interferences between V2X transmission and cellular link;

the first node provides multiple beams for the second node in the present disclosure to choose from, i.e., corresponding to the K1 candidate reference signal(s), thus helping the second node select a better beam to receive the first signal;

the first node determines the target reference signal by receiving the K2 first-type radio signal(s) from the third node, thus ensuring that signals transmitted on the target reference signal-related beam won't interfere with the downlink transmission in the cellular link.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first radio resource pool and a second radio resource pool according to one embodiment of the present disclosure.

FIG. 7 illustrates a schematic diagram of a first type according to one embodiment of the present disclosure.

FIG. 8 illustrates a schematic diagram of K1 candidate reference signal(s) according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
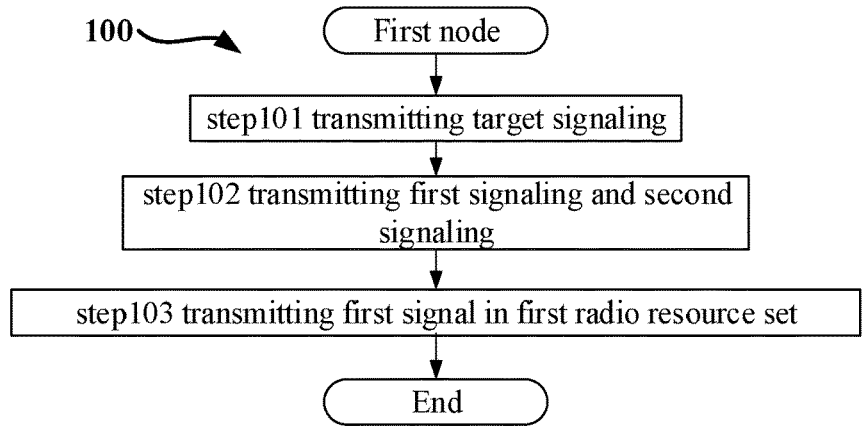
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, the first node in the present disclosure transmits a target signaling in step 101; transmits a first signaling and a second signaling in step 102; and transmits a first signal in a first radio resource set in step 103.

In Embodiment 1, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the target signaling is transmitted in sidelink.

In one embodiment, the target signaling is used for indicating the target reference signal.

In one embodiment, the target signaling is a Radio Resource Control (RRC) signaling.

In one embodiment, the target signaling is a higher-layer signaling.

In one embodiment, the target signaling is UE-specific.

In one embodiment, the target signaling is transmitted in a PC5 link.

In one embodiment, a physical layer channel bearing the target signaling comprises a Physical Sidelink Control Channel (PSCCH).

In one embodiment, the target signaling is a Media Access Control (MAC) Control Element (CE).

In one embodiment, the target signaling is used for indicating a target spatial receive parameter group, the target reference signal being associated with the target spatial receive parameter group.

In one embodiment, the target signaling is used for indicating a target antenna port, the target reference signal employing the target antenna port for transmission.

In one embodiment, the target reference signal comprises a Channel State Information Reference Signal (CSI-RSs).

In one embodiment, the target reference signal comprises a Sounding Reference Signal (SRS) resource.

In one embodiment, the target reference signal is transmitted in sidelink.

In one embodiment, the first reference signal comprises a CSI-RS.

In one embodiment, the first reference signal comprises an SRS.

In one embodiment, the first reference signal is transmitted in sidelink.

In one embodiment, the first signaling and the second signaling are both transmitted in sidelink.

In one embodiment, the first signaling and the second signaling are both transmitted in a PC5 link.

In one embodiment, the first signaling and the second signaling are both RRC signalings.

In one embodiment, the first signaling and the second signaling are both higher-layer signalings.

In one embodiment, the first signaling and the second signaling are both cell-specific.

In one embodiment, the first radio resource pool comprises L1 radio resource set(s), L1 being a positive integer.

In one subembodiment, when the first radio resource set belongs to the first radio resource pool, the first radio resource set is one of the L1 radio resource set(s).

In one embodiment, the first radio resource pool comprises L2 radio resource set(s), L2 being a positive integer.

In one subembodiment, when the first radio resource set belongs to the first radio resource pool, the first radio resource set is one of the L1 radio resource set(s).

In one embodiment, the above-mentioned phrase that the first signal is associated with a first reference signal comprises a meaning that: the first signal and the first reference signal are Quasi co-located (QCL).

In one embodiment, the above-mentioned phrase that the first signal is associated with a first reference signal comprises a meaning that: all or partial large-scale properties of the first reference signal can be used to infer all or partial large-scale properties of the first signal. the large-scale properties include: one or more of Delay Spread, Doppler Spread, Doppler Shift, Path Loss or Average Gain.

In one embodiment, the above-mentioned phrase that the first signal is associated with a first reference signal comprises a meaning that: a spatial transmission parameter group for the first signal can be determined from a spatial receive parameter group for the first reference signal.

In one embodiment, the above-mentioned phrase that the first signal is associated with a first reference signal comprises a meaning that: a transmission beamforming vector of the first signal can be determined from a reception beamforming vector of the first reference signal.

In one embodiment, the above-mentioned phrase that the first signal is associated with a first reference signal comprises a meaning that: a spatial transmission parameter group for the first signal can be determined from a spatial transmission parameter group for the first reference signal.

In one embodiment, the above-mentioned phrase that the first signal is associated with a first reference signal comprises a meaning that: a transmission beamforming vector of the first signal can be determined from a transmission beamforming vector of the first reference signal.

In one subembodiment of the above four embodiments, the above operation is done in the first node.

In one embodiment, the above-mentioned phrase that the first signal is associated with a first reference signal comprises a meaning that: a spatial receive parameter group for the first signal can be determined from a spatial transmission parameter group for the first reference signal.

In one embodiment, the above-mentioned phrase that the first signal is associated with a first reference signal comprises a meaning that: a reception beamforming vector of the first signal can be determined from a transmission beamforming vector of the first reference signal.

In one embodiment, the above-mentioned phrase that the first signal is associated with a first reference signal comprises a meaning that: a spatial receive parameter group for the first signal can be determined from a spatial receive parameter group for the first reference signal.

In one embodiment, the above-mentioned phrase that the first signal is associated with a first reference signal comprises a meaning that: a reception beamforming vector of the first signal can be determined from a reception beamforming vector of the first reference signal.

In one subembodiment of the above four embodiments, the above operation is done in the second node in the present disclosure.

In one embodiment, the above-mentioned phrase that the first signal is associated with a first reference signal comprises a meaning that: the first signal is transmitted in a first radio resource pool, and the first reference signal is associated with the first radio resource pool, the first radio resource pool comprising the first radio resource set.

In one embodiment, the above-mentioned phrase that the first signal is associated with a target reference signal comprises a meaning that: the first signal and the target reference signal are QCL.

In one embodiment, the above-mentioned phrase that the first signal is associated with a target reference signal comprises a meaning that: all or partial large-scale properties of the first signal can be inferred from all or partial large-scale properties of the target reference signal; the large-scale properties include: one or more of Delay Spread, Doppler Spread, Doppler Shift, Pathloss or Average Gain.

In one embodiment, the above-mentioned phrase that the first signal is associated with a target reference signal comprises a meaning that: a spatial transmission parameter group for the first signal can be determined from a spatial receive parameter group for the target reference signal.

In one embodiment, the above-mentioned phrase that the first signal is associated with a target reference signal comprises a meaning that: a transmission beamforming vector of the first signal can be determined from a reception beamforming vector of the target reference signal.

In one embodiment, the above-mentioned phrase that the first signal is associated with a target reference signal comprises a meaning that: a spatial transmission parameter group for the first signal can be determined from a spatial transmission parameter group for the target reference signal.

In one embodiment, the above-mentioned phrase that the first signal is associated with a target reference signal comprises a meaning that: a transmission beamforming vector of the first signal can be determined from a transmission beamforming vector of the target reference signal.

In one subembodiment of the above four embodiments, the above operation is done in the first node.

In one embodiment, the above-mentioned phrase that the first signal is associated with a first reference signal comprises a meaning that: a spatial receive parameter group for the first signal can be determined from a spatial transmission parameter group for the first reference signal.

In one embodiment, the above-mentioned phrase that the first signal is associated with a first reference signal comprises a meaning that: a reception beamforming vector of the first signal can be determined from a transmission beamforming vector of the first reference signal.

In one embodiment, the above-mentioned phrase that the first signal is associated with a first reference signal comprises a meaning that: a spatial receive parameter group for the first signal can be determined from a spatial receive parameter group for the first reference signal.

In one embodiment, the above-mentioned phrase that the first signal is associated with a first reference signal comprises a meaning that: a reception beamforming vector of the first signal can be determined from a reception beamforming vector of the first reference signal.

In one subembodiment of the above four embodiments, the above operation is done in the second node.

In one embodiment, the above-mentioned phrase that the first signal is associated with a first reference signal comprises a meaning that: the first signal is transmitted in a first radio resource pool, and the first reference signal is associated with the first radio resource pool, the first radio resource pool comprising the first radio resource set.

In one embodiment, the transmission beamforming vector in the present disclosure comprises at least one of a transmission analog beamforming vector or a transmission digital beamforming vector.

In one embodiment, the reception beamforming vector in the present disclosure comprises at least one of a reception analog beamforming vector or a reception digital beamforming vector.

In one embodiment, the QCL comprises QCL-Type D in the New Radio (NR) system.

In one embodiment, the QCL comprises QCL-Type A in the NR system.

In one embodiment, the QCL comprises QCL-Type B in the NR system.

In one embodiment, the QCL comprises QCL-Type C in the NR system.

In one embodiment, the QCL comprises QCL-Type D in TS 36.214.

In one embodiment, the QCL comprises QCL-Type A in TS 36.214.

In one embodiment, the QCL comprises QCL-Type B in TS 36.214.

In one embodiment, the QCL comprises QCL-Type C in TS 36.214.

In one embodiment, the above-mentioned phrase that the target reference signal is unrelated to the first reference signal comprises a meaning that: the target reference signal and the first reference signal are non-QCL.

In one embodiment, the above-mentioned phrase that the target reference signal is unrelated to the first reference signal comprises a meaning that: A spatial transmission parameter group for the target reference signal and a spatial transmission parameter group for the first reference signal are orthogonal.

In one embodiment, the above-mentioned phrase that the target reference signal is unrelated to the first reference signal comprises a meaning that: spatial coverage of a beamforming vector for the target reference signal and spatial coverage of a beamforming vector for the first reference signal are non-overlapping.

In one embodiment, the above-mentioned phrase that the target reference signal is unrelated to the first reference signal comprises a meaning that: a beamforming vector for the target reference signal and a beamforming vector for the first reference signal are orthogonal.

In one embodiment, the above-mentioned phrase that the target reference signal is unrelated to the first reference signal comprises a meaning that: in the case of occupying the same time-frequency resources, transmission of the target reference signal won't cause interference to reception of the first reference signal.

In one embodiment, the above-mentioned phrase that the target reference signal is unrelated to the first reference signal comprises a meaning that: in the case of occupying the same time-frequency resources, transmission of the first reference signal won't cause interference to reception of the target reference signal.

In one embodiment, a physical layer channel bearing the first signal comprises a Physical Sidelink Shared Channel (PSSCH).

In one embodiment, a physical layer channel bearing the first signal comprises a PSFCH.

In one embodiment, a physical layer channel bearing the first signal comprises a PSCCH.

In one embodiment, the first signal is a HARQ-ACK for a data channel in the sidelink.

In one embodiment, the first signal is feedback for the sidelink.

In one embodiment, the first signal comprises Channel State Information (CSI) for the sidelink.

In one embodiment, the first signal comprises a Channel Quality Indicator (CQI) for the sidelink.

In one embodiment, the first signal comprises a Rank Indicator (RI) for the sidelink.

In one embodiment, the first node comprises a first panel and a second panel, the first panel being associated with the first reference signal, the second panel being associated with the target reference signal.

In one subembodiment, the first panel is associated with X1 antenna ports, a first antenna port being one of the X1 antenna ports, where X1 is a positive integer, the first reference signal employs the first antenna port to transmit.

In one subsidiary embodiment of the above subembodiment, any two antenna ports among the X1 antenna ports are QCL.

In one subembodiment, the second panel is associated with X2 antenna ports, the target antenna port being one of the X2 antenna ports, where X2 is a positive integer, the target reference signal employs the target antenna port to transmit.

In one subsidiary embodiment of the above subembodiment, any two antenna ports among the X2 antenna ports are QCL.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an OFDM symbol containing Cyclic Prefix (CP).

In one embodiment, the multicarrier symbol in the present disclosure is a Discrete Fourier Transform Spreading Orthogonal Frequency Division Multiplexing (DFT-s-OFDM) symbol containing CP.

In one embodiment, the first radio resource pool in the present disclosure comprises L1 radio resource set(s), while the second radio resource pool in the present disclosure comprises L2 radio resource set(s), where L1 and L2 are both positive integers.

In one subembodiment, L1 is equal to 1.

In one subembodiment, L2 is equal to 1.

In one subembodiment, any of the L1 radio resource set(s) occupies a positive integer number of multicarrier symbol(s) in time domain, and a positive integer number of subcarrier(s) in frequency domain.

In one subembodiment, any of the L1 radio resource set(s) occupies L3 multicarrier symbol(s) in time domain, and frequency-domain resources corresponding to L4 RB(s) in frequency domain, where L3 and L4 are positive integers.

In one subembodiment, any of the L2 radio resource set(s) occupies a positive integer number of multicarrier symbol(s) in time domain, and a positive integer number of subcarrier(s) in frequency domain.

In one subembodiment, any of the L2 radio resource set(s) occupies L5 multicarrier symbol(s) in time domain, and frequency-domain resources corresponding to L6 RB(s) in frequency domain, where L5 and L6 are positive integers.

In one subembodiment, any of the L1 radio resource set(s) comprises a Physical Uplink Control Channel (PUCCH) Resource.

In one subembodiment, any of the L2 radio resource set(s) comprises a PUCCH resource.

In one subembodiment, any of the L1 radio resource set(s) comprises time-domain resources and frequency-domain resources.

In one subembodiment, any of the L2 radio resource set(s) comprises time-domain resources and frequency-domain resources.

In one subembodiment, any of the L1 radio resource set(s) comprises code-domain resources.

In one subembodiment, any of the L2 radio resource set(s) comprises code-domain resources.

In one subembodiment, any of the L1 radio resource set(s) comprises spatial-domain resources.

In one subembodiment, any of the L2 radio resource set(s) comprises spatial-domain resources.

In one subembodiment, the first radio resource set is one of the L1 radio resource set(s).

In one subembodiment, the first radio resource set is one of the L2 radio resource set(s).

In one embodiment, two signals being QCL means that: all or partial large-scale properties of one of the two signals can be used to infer all or partial large-scale properties of the other of the two signals; the large-scale properties include: one or more of Delay Spread, Doppler Spread, Doppler Shift, Pathloss or Average Gain.

In one embodiment, a first index and a second index respectively correspond to the first panel and the second panel in the present disclosure; when the first signal is associated with the first reference signal, the first index is used for generating the first signal; when the first signal is associated with the target reference signal, the second index is used for generating the first signal.

In one embodiment, a first index is specific to the first panel.

In one embodiment, a first index is a non-negative integer.

In one embodiment, a first index is less than 1024.

In one embodiment, a first index is less than 65536.

In one embodiment, a second index is specific to the second panel.

In one embodiment, a second index is a non-negative integer.

In one embodiment, a second index is less than 1024.

In one embodiment, a second index is less than 65536.

In one embodiment, the first index is different from the second index.

In one embodiment, the first radio resource set comprises time-domain resources and frequency-domain resources.

In one embodiment, the first radio resource set comprises code-domain resources.

In one embodiment, the first radio resource set comprises spatial-domain resources.

In one embodiment, the first radio resource set corresponds to one antenna port.

In one embodiment, the first radio resource set corresponds to one reference signal.

In one embodiment, the first radio resource set corresponds to a beamforming vector.

In one embodiment, the first radio resource set occupies a positive integer number of multicarrier symbol(s) in time domain, and a positive integer number of subcarrier(s) in frequency domain.

In one embodiment, the first radio resource set occupies T1 multicarrier symbol(s) in time domain, and frequency-domain resources corresponding to T2 Resource Block(s) (RB(s)), where T1 and T2 are both positive integers.

In one embodiment, the first radio resource pool in the present disclosure and the second radio resource pool in the present disclosure are maintained by a same serving cell.

In one embodiment, the spatial-domain resources in the present disclosure include a transmission antenna port.

In one embodiment, a said spatial-domain resource comprised by the radio resource set in the present disclosure comprises: a target Reference Signal (RS) which is QCL with a transmission antenna port in the radio resource set.

In one embodiment, a said spatial-domain resource comprised by the radio resource set in the present disclosure comprises: a beam direction corresponding to a transmission antenna port employed by the radio resource set.

In one embodiment, a said spatial-domain resource comprised by the radio resource set in the present disclosure comprises: an analog beamforming vector corresponding to a transmission antenna port employed by the radio resource set.

In one embodiment, a said spatial-domain resource comprised by the radio resource set in the present disclosure comprises: a digital beamforming vector corresponding to a transmission antenna port employed by the radio resource set.

In one embodiment, the first signal is a radio signal.

In one embodiment, the first signal is a baseband signal.

In one embodiment, the sidelink refers to a radio link between terminals.

In one embodiment, the cellular link in the present disclosure refers to a radio link between a terminal and a base station.

In one embodiment, the sidelink in the present disclosure corresponds to a PC5 interface.

In one embodiment, the cellular link in the present disclosure corresponds to a Uu interface.

In one embodiment, the sidelink in the present disclosure is used for V2X communications.

In one embodiment, the cellular link in the present disclosure is used for cellular communications.

In one embodiment, the first signal is a feedback signal for V2X mode1 transmission.

In one embodiment, the first signal is a feedback signal for V2X mode2 transmission.

Embodiment 2

Figure 2:
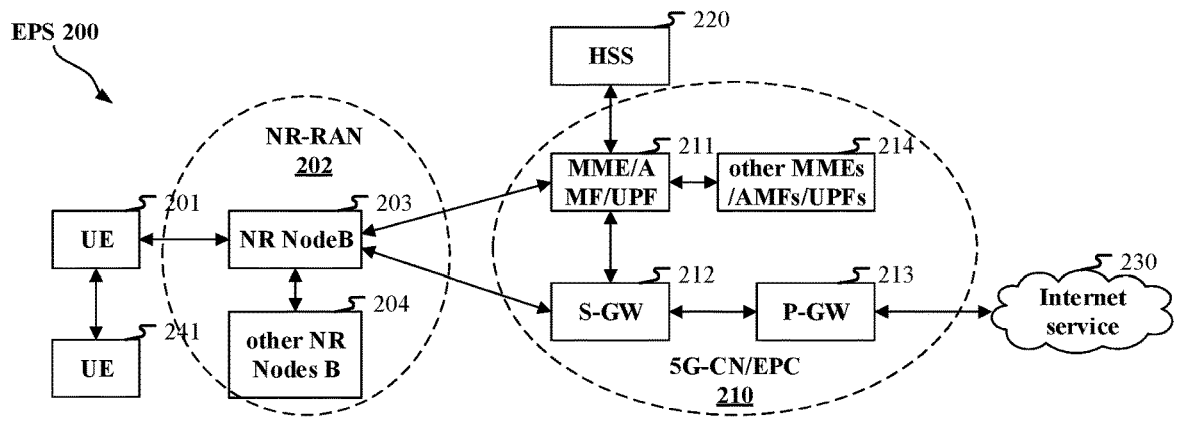
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, a UE 241 in sidelink communication with the UE(s) 201, an NG-RAN 202, a Evolved Packet Core/5G-Core Network (EPC-5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the third node in the present disclosure.

In one embodiment, an air interface between the UE 201 and the gNB 203 is a Uu interface.

In one embodiment, an air interface between the UE 201 and the UE 241 is a PC5 interface.

In one embodiment, a radio link between the UE 201 and the gNB 203 is a cellular link.

In one embodiment, a radio link between the UE 201 and the UE 241 is a sidelink.

In one embodiment, the first node in the present disclosure is a terminal within the coverage of the gNB 203.

In one embodiment, the second node in the present disclosure is a terminal within the coverage of the gNB 203.

In one embodiment, the second node in the present disclosure is a terminal out of the coverage of the gNB 203.

In one embodiment, the first node and the second node in the present disclosure are respectively served by two base stations.

In one embodiment, the first node and the second node in the present disclosure are respectively served by two serving cells.

In one embodiment, the first node in the present disclosure is a terminal within coverage of a cellular network, while the second node in the present disclosure is a terminal out of the coverage of the cellular network.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the first node and the second node belong to a V2X Pair.

In one embodiment, the first node is an automobile.

In one embodiment, the first node is a vehicle.

In one embodiment, the first node is a Road Side Unit (RSU).

In one embodiment, the first node is a Group Header of a terminal group.

In one embodiment, the first node supports beamforming-based transmissions.

In one embodiment, the second node is a vehicle.

In one embodiment, the second node is an automobile.

In one embodiment, the second node is an RSU.

In one embodiment, the second node is a Group Header of a terminal group.

In one embodiment, the second node supports beamforming-based transmissions.

In one embodiment, the third node is a base station.

In one embodiment, the third node is a serving cell.

In one embodiment, the first node supports multiple beamforming vector transmissions.

In one embodiment, the second node supports multiple beamforming vector transmissions.

In one embodiment, the first node at least is configured with two panels, which are respectively the first panel and the second panel in the present disclosure.

Embodiment 3

Figure 3:
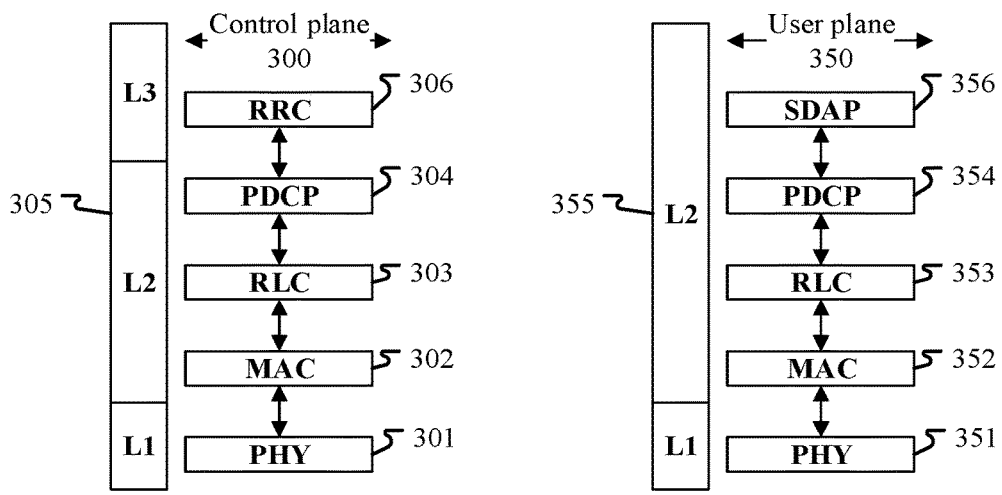
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a MAC sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300. The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the target signaling is generated by the MAC 352, or the MAC 302.

In one embodiment, the target signaling is generated by the PHY 301, or the PHY 351.

In one embodiment, the target signaling is generated by the RRC 306.

In one embodiment, the first signaling is generated by the MAC 352, or the MAC 302.

In one embodiment, the first signaling is generated by the RRC 306.

In one embodiment, the second signaling is generated by the MAC 352, or the MAC 302.

In one embodiment, the second signaling is generated by the RRC 306.

In one embodiment, the first signal is generated by the PHY 301, or the PHY 351.

In one embodiment, the first signal is generated by the MAC 352, or the MAC 302.

In one embodiment, any of the K2 first-type radio signal(s) is generated by the PHY 301, or the PHY 351.

In one embodiment, any of the K1 candidate reference signal(s) is generated by the PHY 301, or the PHY 351.

In one embodiment, the third signaling is generated by the PHY 301, or the PHY 351.

In one embodiment, the second signal is generated by the MAC 352, or the MAC 302.

In one embodiment, the second signal is generated by the PHY 301, or the PHY 351.

Embodiment 4

Figure 4:
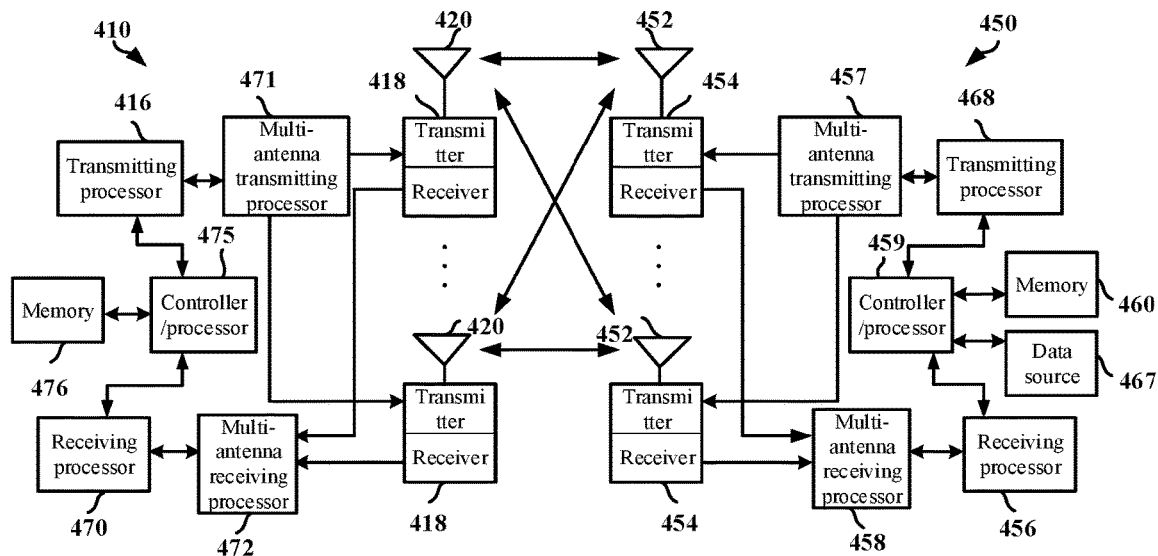
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: transmits a target signaling, transmits a first signaling and a second signaling, and transmits a first signal in a first radio resource set, the target signaling being used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the first communication node 450 comprises a memory that stores a computer readable instruction program, the computer readable instruction program generates actions when executed by at least one processor, which include: transmitting a target signaling, transmitting a first signaling and a second signaling, and transmitting a first signal in a first radio resource set, the target signaling being used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: receives a target signaling, receives a first signaling and a second signaling, and receives a first signal in a first radio resource set; the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the second communication device 410 comprises a memory that stores a computer readable instruction program, the computer readable instruction program generates actions when executed by at least one processor, which include: receiving a target signaling, receiving a first signaling and a second signaling, and receiving a first signal in a first radio resource set; the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits K2 first-type radio signal(s); the K2 first-type radio signal(s) is (are respectively) associated with K2 first-type reference signal(s); a target reference signal is unrelated to any one of the K2 first-type reference signal(s); a first reference signal is related to at least one of the K2 first-type reference signal(s); a receiver for the K2 first-type radio signal(s) includes a first node, the first node firstly transmits a target signaling, and then transmits a first signaling and second signaling, and transmits a first signal in a first radio resource set; the target signaling is used to determine the target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with the first reference signal; when the first radio resource set belongs to the second radio resource pool, the first signal is associated with the target reference signal, the target reference signal being unrelated to the first reference signal; the first signal is transmitted in sidelink; M1 and M2 are both positive integers greater than 1; a receiver for the first signal includes a second node, the second node and the third node being non-co-located; K2 is a positive integer.

In one embodiment, the second communication device 410 comprises a memory that stores a computer readable instruction program, the computer readable instruction program generates actions when executed by at least one processor, which include: transmitting K2 first-type radio signal(s); the K2 first-type radio signal(s) is (are respectively) associated with K2 first-type reference signal(s); a target reference signal is unrelated to any one of the K2 first-type reference signal(s); a first reference signal is related to at least one of the K2 first-type reference signal(s); a receiver for the K2 first-type radio signal(s) includes a first node, the first node firstly transmits a target signaling, and then transmits a first signaling and second signaling, and transmits a first signal in a first radio resource set; the target signaling is used to determine the target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with the first reference signal; when the first radio resource set belongs to the second radio resource pool, the first signal is associated with the target reference signal, the target reference signal being unrelated to the first reference signal; the first signal is transmitted in sidelink; M1 and M2 are both positive integers greater than 1; a receiver for the first signal includes a second node, the second node and the third node being non-co-located; K2 is a positive integer.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the transmitter 454, the multi-antenna transmitting processor 457, the transmitting processor 468, or the controller/processor 459 is used for transmitting the target signaling; at least one of the antenna 420, the receiver 418, the multi-antenna receiving processor 472, the receiving processor 470 or the controller/processor 475 is used for receiving the target signaling.

In one embodiment, at least one of the antenna 452, the transmitter 454, the multi-antenna transmitting processor 457, the transmitting processor 468, or the controller/processor 459 is used for transmitting the first signaling and the second signaling; at least one of the antenna 420, the receiver 418, the multi-antenna receiving processor 472, the receiving processor 470 or the controller/processor 475 is used for receiving the first signaling and the second signaling.

In one embodiment, at least the first four of the antenna 452, the transmitter 454, the multi-antenna transmitting processor 457, the transmitting processor 468, and the controller/processor 459 are used for transmitting a first signal in a first radio resource set; at least the first four of the antenna 420, the receiver 418, the multi-antenna receiving processor 472, the receiving processor 470 and the controller/processor 475 are used for receiving a first signal in a first radio resource set.

In one embodiment, at least one of the antenna 452, the receiver 454, the multi-antenna receiving processor 458, the receiving processor 456, or the controller/processor 459 is used for receiving K2 first-type radio signal(s); at least one of the antenna 420, the transmitter 418, the multi-antenna transmitting processor 471, the transmitting processor 416 or the controller/processor 475 is used for transmitting K2 first-type radio signal(s).

In one embodiment, at least one of the antenna 452, the receiver 454, the multi-antenna receiving processor 458, the receiving processor 456, or the controller/processor 459 is used for receiving a third signaling and a second signal; at least one of the antenna 420, the transmitter 418, the multi-antenna transmitting processor 471, the transmitting processor 416 or the controller/processor 475 is used for transmitting a third signaling and a second signal.

Embodiment 5

Figure 5:
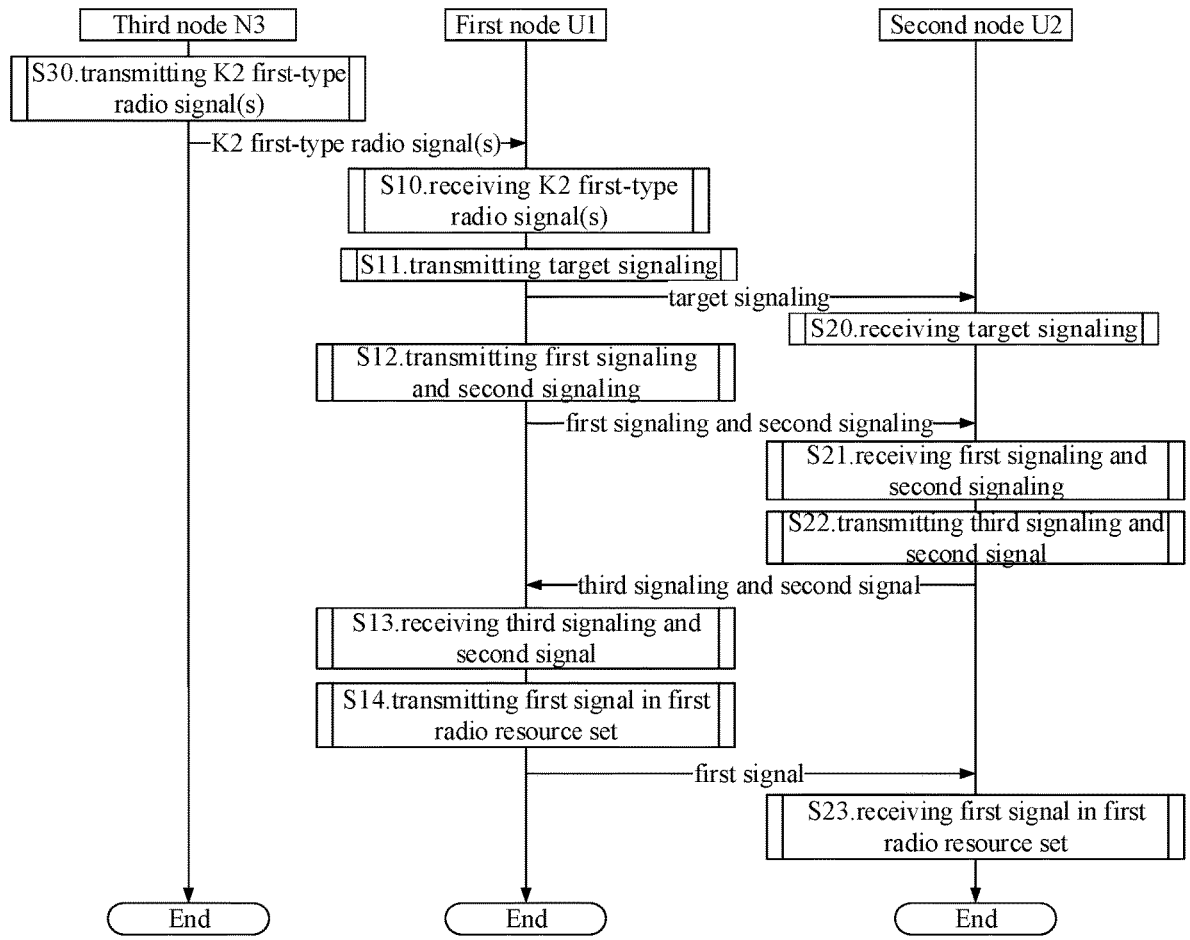
FIG. 5 illustrates a flowchart of a first signal according to one embodiment of the present disclosure.

Embodiment 5 illustrates a flowchart of a first signaling, as shown in FIG. 5. In FIG. 5, a first node U1 and a second node U2 are in communication via a sidelink; a first node U1 and a third node N3 are in communication via a cellular link.

The first node U1 receives K2 first-type radio signal(s) in step S10; transmits a target signaling in step S11; and transmits a first signaling and a second signaling in step S12; receives a third signaling and a second signal in step S13; and transmits a first signal in a first radio resource set in step S14.

The second node U2 receives a target signaling in step S20; receives a first signaling and a second signaling in step S21; transmits a third signaling and a second signal in step S22; And receives a first signal in a first radio resource set in step S23.

The third node N3 transmits K2 first-type radio signal(s) in step S30.

In Embodiment 5, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1; the K2 first-type radio signal(s) is (are respectively) associated with K2 first-type reference signal(s); the target reference signal is unrelated to any one of the K2 first-type reference signal(s); the first reference signal is related to at least one of the K2 first-type reference signal(s); a receiver for the first signal includes a second node U2, a transmitter for the K2 first-type radio signal(s) is a third node N3, the second node U2 and the third node N3 being non-co-located; K2 is a positive integer; the third signaling comprises configuration information for the second signal, the first signal comprising feedback for the second signal.

In one embodiment, the target signaling is used to indicate K1 candidate reference signal(s), the target reference signal is one of the K1 candidate reference signal(s), where K1 is a positive integer.

In one subembodiment, K1 is equal to 1.

In one subembodiment, K1 is a positive integer greater than 1.

In one subembodiment, any of the K1 candidate reference signal(s) is transmitted in the sidelink.

In one subembodiment, any of the K1 candidate reference signal(s) is transmitted in a PC-5 link.

In one subembodiment, any of the K1 candidate reference signal(s) is a CSI-RS.

In one subembodiment, any of the K1 candidate reference signal(s) is an SRS.

In one subembodiment, the K1 candidate reference signal(s) corresponds (respectively correspond) to K1 candidate antenna port(s), each of the K1 candidate antenna ports being configured by the first node U1.

In one embodiment, any of the K2 first-type radio signal(s) is transmitted in a cellular link.

In one embodiment, any of the K2 first-type radio signal(s) is a Physical Downlink Control Channel (PDCCH).

In one embodiment, any of the K2 first-type radio signal(s) is a Physical Downlink Shared Channel (PDSCH).

In one embodiment, there is at least one first-type radio signal of the K2 first-type radio signal(s) being a PDCCH.

In one embodiment, there is at least one first-type radio signal of the K2 first-type radio signal(s) being a PDSCH.

In one embodiment, any of the K2 first-type reference signal(s) is transmitted in a cellular link.

In one embodiment, any of the K2 first-type reference signal(s) is a CSI-RS.

In one embodiment, any of the K2 first-type reference signal(s) is an SRS.

In one embodiment, there is at least one first-type radio signal of the K2 first-type radio signal(s) being a PDCCH.

In one embodiment, there is at least one first-type radio signal of the K2 first-type radio signal(s) being a CSI-RS.

In one embodiment, there is at least one first-type radio signal of the K2 first-type radio signal(s) being an SRS.

In one embodiment, the K2 first-type radio signal(s) is (are respectively) QCL with the K2 first-type reference signal(s).

In one subembodiment, a given first-type radio signal is any one of the K2 first-type radio signal(s), and a given first-type reference signal is one of the K2 first-type reference signal(s) being associated with the given first-type radio signal; the given first-type radio signal and the given first-type reference signal are QCL.

In one subembodiment, a spatial receive parameter group for the given first-type radio signal can be determined from a spatial transmission parameter group for the given first-type reference signal.

In one subembodiment, a spatial transmission parameter group for the given first-type radio signal can be determined from a spatial transmission parameter group for the given first-type reference signal.

In one subembodiment, a spatial receive parameter group for the given first-type radio signal can be determined from a spatial receive parameter group for the given first-type reference signal.

In one subembodiment, a spatial transmission parameter group for the given first-type radio signal can be determined from a spatial receive parameter group for the given first-type reference signal.

In one embodiment, a given candidate antenna port is any candidate antenna port of the K1 candidate antenna port(s); in the case of occupying the same time-frequency resources, a radio signal transmitted on the given candidate antenna port won't interfere with a radio signal transmitted on a given first-type antenna port, the K2 first-type reference signal(s) is (are respectively) transmitted on K2 first-type antenna ports, the given first-type antenna port being any one of the K2 first-type antenna ports.

In one embodiment, the above-mentioned phrase that the target reference signal is unrelated to any of the K2 first-type reference signal(s) comprises a meaning that: the target reference signal is non-QCL with any one of the K2 first-type reference signal(s).

In one embodiment, the above-mentioned phrase that the target reference signal is unrelated to any of the K2 first-type reference signal(s) comprises a meaning that: a beamforming vector for the target reference signal and a beamforming vector for any of the K2 first-type reference signal(s) are orthogonal.

In one embodiment, the above-mentioned phrase that the target reference signal is unrelated to any of the K2 first-type reference signal(s) comprises a meaning that: in the case of occupying the same time-frequency resources, transmission of the target reference signal won't interfere with reception of a specific radio signal corresponding to a given first-type reference signal of the K2 first-type reference signal(s), the specific radio signal being QCL with the given first-type reference signal, the given first-type reference signal being any of the K2 first-type reference signal(s).

In one embodiment, the above-mentioned phrase that the target reference signal is unrelated to any of the K2 first-type reference signal(s) comprises a meaning that: the target reference signal is transmitted using a target antenna port, while any of the K2 first-type reference signal(s) is received using a given first-type antenna port; in the case of occupying the same time-frequency resources, a radio signal transmitted on the target antenna port won't interfere with a radio signal received on the given first-type antenna port.

In one embodiment, the above-mentioned phrase that the first reference signal is related to at least one of the K2 first-type reference signal(s) comprises a meaning that: there is a given first-type reference signal among the K2 first-type reference signal(s), the given first-type reference signal being QCL with the first reference signal.

In one embodiment, the above-mentioned phrase that the first reference signal is related to at least one of the K2 first-type reference signal(s) comprises a meaning that: there is a given first-type reference signal among the K2 first-type reference signal(s), a spatial receive parameter group for the given first-type reference signal can be used for a spatial transmission parameter group for the first reference signal.

In one embodiment, the above-mentioned phrase that the first reference signal is related to at least one of the K2 first-type reference signal(s) comprises a meaning that: there is a given first-type reference signal among the K2 first-type reference signal(s), a spatial transmission parameter group for the given first-type reference signal can be used for a spatial transmission parameter group for the first reference signal.

In one embodiment, the phrase of the second node U2 and the third node N3 being non-co-located means that: the second node U2 and the third node N3 are respectively in two geographical locations.

In one embodiment, the phrase of the second node U2 and the third node N3 being non-co-located means that: there isn't a wired connection between the second node U2 and the third node N3.

In one embodiment, the phrase of the second node U2 and the third node N3 being non-co-located means that: an identifier for the second node U2 and an identifier for the third node N3 are different.

In one embodiment, the phrase of the second node U2 and the third node N3 being non-co-located means that: the second node U2 is a UE, and the third node N3 is a base station.

In one embodiment, the third node N3 is a base station to which a serving cell of the second node U2 is attached.

In one embodiment, the third node N3 is a base station to which a serving cell of the first node U1 is attached, while the second node U2 is a terminal device out of the coverage of the third node N3.

In one embodiment, each of the K2 first-type radio signal(s) is transmitted in a cellular link.

In one embodiment, the third signaling comprises the target signaling.

In one embodiment, the target signaling is a field in the third signaling.

In one embodiment, the third signaling is a piece of SCI.

In one embodiment, a physical layer channel bearing the third signaling comprises a PSCCH.

In one embodiment, a physical layer channel bearing the second signal comprises a PSSCH.

In one embodiment, a transport layer channel bearing the second signal comprises a Sidelink Shared Channel (SL-SCH).

In one embodiment, the second signal is a radio signal.

In one embodiment, the second signal is a baseband channel.

In one embodiment, the third signaling is used for scheduling the second signal.

In one embodiment, the configuration information comprises a Modulation and Coding Scheme (MCS) employed by the second signal.

In one embodiment, the configuration information comprises DeModulation Reference Signals (DMRS) configuration information for the second signal.

In one embodiment, the DMRS configuration information comprises one or more of a port for the DMRS, time-domain resources occupied, frequency-domain resources occupied, code-domain resources occupied, an RS sequence, a mapping mode, a DMRS type, a cyclic shift, or an Orthogonal Cover Code (OCC).

In one embodiment, the configuration information comprises a New Data Indicator (NDI) corresponding to the second signal.

In one embodiment, the configuration information comprises a Redundancy Version (RV) corresponding to the second signal.

In one embodiment, the configuration information comprises time-domain resources occupied by the second signal.

In one embodiment, the configuration information comprises frequency-domain resources occupied by the second signal.

In one embodiment, the second node U2 is a terminal.

In one embodiment, the second node U2 and the first node U1 are in V2X communications.

In one embodiment, the second node U2 and the first node U1 belong to a same serving cell.

In one embodiment, the second node U2 and the first node U1 are served by a same serving cell.

In one embodiment, the second node U2 and the first node U1 are respectively served by different serving cells.

In one embodiment, the third signaling is used to indicate time-domain resources occupied by the first radio resource set, or the third signaling is used to indicate frequency-domain resources occupied by the first radio resource set.

In one embodiment, the third signaling is used to determine time-domain resources occupied by the first radio resource set, or the third signaling is used to determine frequency-domain resources occupied by the first radio resource set.

In one embodiment, time-domain resources occupied by the second signal are used to determine time-domain resources occupied by the first radio resource set.

In one embodiment, frequency-domain resources occupied by the second signal are used to determine frequency-domain resources occupied by the first radio resource set.

In one embodiment, the target signal is a radio signal.

In one embodiment, the target signal is a baseband channel.

In one embodiment, the first node U1 and the second node U2 are served by a same serving cell, and the third node N3 is a base station attached to the serving cell for the first node U1.

In one embodiment, the first node U1 and the second node U2 are served by different serving cells, and the third node N3 is a base station attached to the serving cell for the first node U1.

In one embodiment, the first node U1 and the second node U2 are served by different serving cells, and the third node N3 is a base station attached to the serving cell for the second node U2.

In one embodiment, the first signal is used to indicate whether the second signal is correctly received.

In one embodiment, the first signal is used to indicate that the second signal is falsely received.

In one embodiment, the first signal is used to indicate that the second signal is correctly received.

In one embodiment, the first signal is only used to indicate that the second signal is falsely received.

In one embodiment, the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

In one embodiment, the second radio resource pool comprises M2 multicarrier symbols, any of the M2 multicarrier symbols being of a type other than the first type.

In one embodiment, the second radio resource pool comprises M2 multicarrier symbols, any of the M2 multicarrier symbols being of the second type.

In one embodiment, the second radio resource pool comprises M2 multicarrier symbols, any of the M2 multicarrier symbols being of the third type.

In one embodiment, the second radio resource pool comprises M2 multicarrier symbols, any of the M2 multicarrier symbols being of either the second type or the third type.

Embodiment 6

Embodiment 6 illustrates a schematic diagram of a first radio resource pool and a second radio resource pool according to one embodiment of the present disclosure. as shown in FIG. 6. In FIG. 6, the first radio resource pool comprises M1 multicarrier symbols in time domain, any of the M1 multicarrier symbols being of a first type; the second radio resource pool comprises M2 multicarrier symbols in time domain, there is at least one multicarrier symbol among the M2 multicarrier symbols being of a type other than the first type; M1 and M2 are both positive integers greater than 1.

In one embodiment, the phrase that any of the M1 multicarrier symbols being of a first type means that: the M1 multicarrier symbols are all reserved for uplink transmission in the cellular link.

In one embodiment, the phrase that there is at least one multicarrier symbol among the M2 multicarrier symbols being of a type other than the first type means that: there is at least one multicarrier symbol among the M2 multicarrier symbols being reserved for downlink transmission in the cellular link.

In one embodiment, the phrase that there is at least one multicarrier symbol among the M2 multicarrier symbols being of a type other than the first type means that: there is at least one multicarrier symbol among the M2 multicarrier symbols that not only can be used for a cellular downlink transmission but also for a cellular uplink transmission.

In one embodiment, the M1 multicarrier symbols are discrete in time domain.

In one embodiment, the M1 multicarrier symbols are contiguous in time domain.

In one embodiment, the M2 multicarrier symbols are discrete in time domain.

In one embodiment, the M2 multicarrier symbols are contiguous in time domain.

In one embodiment, there isn't a multicarrier symbol belonging to the M1 multicarrier symbols and the M2 multicarrier symbols simultaneously.

In one embodiment, the M1 multicarrier symbols and the M2 multicarrier symbols are orthogonal in time domain.

In one embodiment, M2 is greater than M1.

In one embodiment, the M2 multicarrier symbols comprise the M1 multicarrier symbols.

In one embodiment, any multicarrier symbol of the M1 multicarrier symbols is one of the M2 multicarrier symbols.

In one embodiment, there is at least one multicarrier symbol among the M2 multicarrier symbols that does not belong to the M1 multicarrier symbols.

Embodiment 7

Embodiment 7 illustrates a schematic diagram of a first type in the present disclosure; as shown in FIG. 7. In FIG. 7, what has been presented is a Format 44 in TS 38.213, Table 11.1.1-1, referring to positions of symbols marked by "D", "F" and "U" based on the Format 44 in a slot under a normal CP. Herein, the symbol marked with "U" is a multicarrier symbol of which a corresponding type in the present disclosure is a first type, the symbol marked with "D" is a multicarrier symbol of which a corresponding type in the present disclosure is a second type, and the symbol marked with "F" is a multicarrier symbol of which a corresponding type in the present disclosure is a third type.

Embodiment 8

Embodiment 8 illustrates a schematic diagram of K1 candidate reference signal(s), as shown in FIG. 8. In FIG. 8, the K1 candidate reference signal(s) corresponds (respectively correspond) to K1 candidate beamforming vectors, and the K1 candidate reference signal(s) is (are respectively) transmitted by K1 candidate antenna port(s).

In one embodiment, the K1 candidate reference signal(s) is (are respectively) transmitted in the sidelink.

In one embodiment, the K1 candidate reference signal(s) is (are respectively) transmitted on K1 multicarrier symbol(s).

In one embodiment, the K1 candidate reference signal(s) is (are respectively) transmitted on K1 multicarrier symbol set(s), any of the K1 multicarrier symbol set(s) comprising a positive integer number of multicarrier symbol(s).

Embodiment 9

Figure 9:
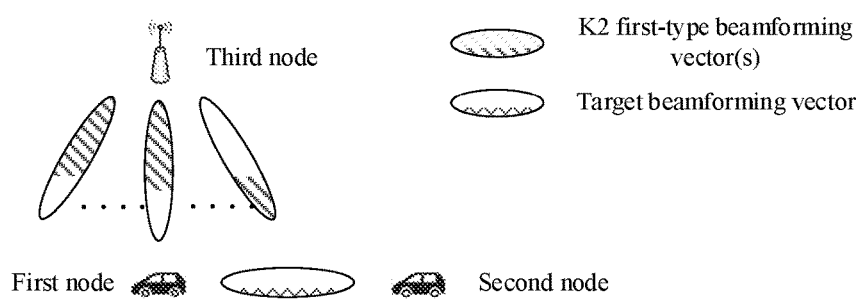
FIG. 9 illustrates a schematic diagram of K2 first-type reference signal(s) according to one embodiment of the present disclosure.

Embodiment 9 illustrates a schematic diagram of K2 first-type reference signal(s), as shown in FIG. 9. In FIG. 9, the K2 first-type reference signal(s) corresponds (respectively correspond) to K2 first-type beamforming vector(s), and the K2 first-type reference signal(s) is (are respectively) transmitted by K2 first-type antenna port(s). The target reference signal illustrated herein corresponds to a target antenna port, the target antenna port corresponding to a target beamforming vector. The target beamforming vector is unrelated to any of the K2 first-type beamforming vectors.

In one embodiment, the K2 first-type antenna ports respectively correspond to K2 transmission antenna ports, the K2 transmission antenna ports being configured on the first node in the present disclosure.

In one subembodiment, the K2 first-type antenna ports are used for the cellular link.

In one subembodiment, the K2 transmission antenna ports are used for the cellular link.

In one embodiment, the target antenna port is used for sidelink.

In one embodiment, a spatial coverage of any first-type beamforming vector among the K2 first-type beamforming vectors and a spatial coverage of the target beamforming vector are non-overlapping.

In one embodiment, any first-type beamforming vector among the K2 first-type beamforming vectors is orthogonal with the target beamforming vector.

Embodiment 10

Figure 10:
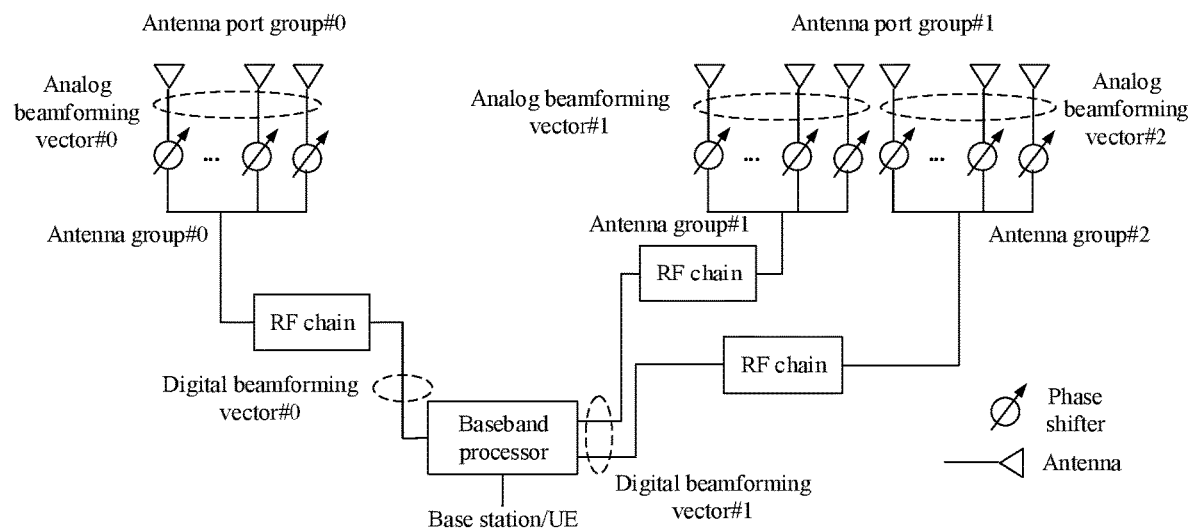
FIG. 10 illustrates a schematic diagram of an antenna structure of a node according to one embodiment of the present disclosure.

Embodiment 10 illustrates a schematic diagram of antennas and antenna port groups, as shown in FIG. 10.

In Embodiment 10, an antenna port group is comprised of a positive integer number of antenna port(s); an antenna port is formed by superimposing antennas in a positive integer number of antenna group(s) through antenna virtualization; an antenna group is comprised of a positive integer number of antenna(s). One antenna group is connected to a baseband processor through a Radio Frequency (RF) chain, so each antenna group corresponds to a different RF chain Mapping coefficients of all antennas in a positive integer number of antenna group(s) comprised by a given antenna port to the given antenna port constitute a beamforming vector corresponding to the given antenna port. Mapping coefficients of multiple antennas comprised in any given one of a positive integer number of antenna groups comprised by the given antenna port to the given antenna port constitute an analog beamforming vector for the given antenna port. Analog beamforming vectors respectively corresponding to the positive integer number of antenna groups are diagonally arranged to form an analog beamforming matrix corresponding to the given antenna port. Mapping coefficients of the positive integer number of antenna groups to the given antenna port constitute a digital beamforming vector corresponding to the given antenna port. A beamforming vector corresponding to the given antenna port is a product of the analog beamforming matrix and the digital beamforming vector respectively corresponding to the given antenna port. Each antenna port in antenna port group is composed of (a) same antenna group(s), and different antenna ports in a same antenna port group correspond to different beamforming vectors.

FIG. 10 illustrates two antenna port groups, which are antenna port group #0 and antenna port group #1. Herein, the antenna port group is composed of antenna group #0, while the antenna port group #1 is composed of antenna group #1 and antenna group #2. Mapping coefficients of multiple antennas comprised in the antenna group #0 to the antenna port group #0 constitute an analog beamforming vector #0; a mapping coefficient of the antenna group #0 to the antenna port group #0 constitute a digital beamforming vector #0. Mapping coefficients of multiple antennas comprised in the antenna group #1 to the antenna port group #1 and mapping coefficients of multiple antennas comprised in the antenna group #2 to the antenna port group #1 respectively constitute an analog beamforming vector #1 and an analog beamforming vector #2; respective mapping coefficients of the antenna group #1 and the antenna group #2 to the antenna port group #1 constitute a digital beamforming vector #1. A beamforming vector corresponding to any antenna port comprised by the antenna port group #0 is a product of the analog beamforming vector #0 and the digital beamforming vector #0. A beamforming vector corresponding to any antenna port comprised by the antenna port group #1 is a product of the digital beamforming vector #1 and an analog beamforming matrix formed by diagonally arrangement of the analog beamforming vector #1 and the analog beamforming vector #2.

In one subembodiment, an antenna port group comprises one antenna port. For example, the antenna port group #0 in FIG. 10 comprises one antenna port.

In one subsidiary embodiment of the above subembodiment, an analog beamforming matrix corresponding to the one antenna port is dimensionally reduced to an analog beamforming vector, while a digital beamforming vector corresponding to the one antenna port is dimensionally reduced to a scaler, a beamforming vector corresponding to the one antenna port is equivalent to an analog beamforming vector corresponding to the one antenna port.

In one subembodiment, an antenna port group comprises multiple antenna ports. For example, the antenna port group #1 in FIG. 10 comprises multiple antenna ports.

In one subsidiary embodiment of the above subembodiment, the multiple antenna ports correspond to a same analog beamforming matrix and different digital beamforming vectors.

In one subembodiment, antenna ports in different antenna port groups correspond to different analog beamforming matrices.

In one subembodiment, any two antenna ports in an antenna port group are Quasi-Colocated (QCL).

In one subembodiment, any two antenna ports in an antenna port group are spatial QCL.

Embodiment 11

Figure 11:
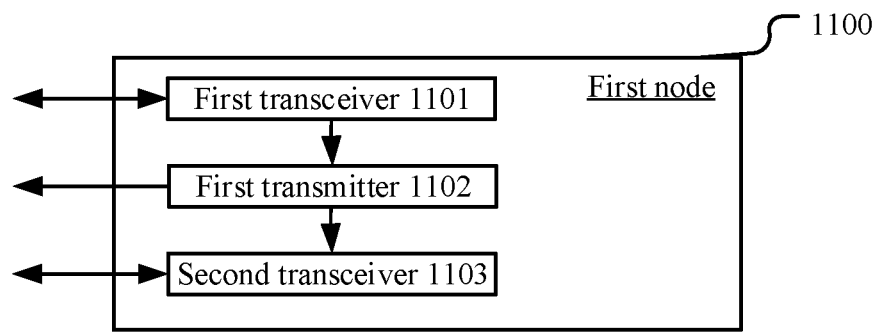
FIG. 11 illustrates a structure block diagram used in a first node according to one embodiment of the present disclosure.

Embodiment 11 illustrates a structure block diagram of a first node, as shown in FIG. 11. In FIG. 11, a first node 1100 comprises a first transceiver 1101, a first transmitter 1102 and a second transceiver 1103.

The first transceiver 1101 transmits a target signaling;

the first transmitter 1102 transmits a first signaling and a second signaling; and the second transceiver 1103 transmits a first signal in a first radio resource set.

In Embodiment 11, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the target signaling is used to indicate K1 candidate reference signal(s), the target reference signal is one of the K1 candidate reference signal(s), where K1 is a positive integer.

In one embodiment, the first transceiver 1101 receives K2 first-type radio signal(s); the K2 first-type radio signal(s) is (are respectively) associated with K2 first-type reference signal(s); the target reference signal is unrelated to any one of the K2 first-type reference signal(s); the first reference signal is related to at least one of the K2 first-type reference signal(s); a receiver for the first signal includes a second node, a transmitter for the K2 first-type radio signal(s) is a third node, the second node and the third node being non-co-located; K2 is a positive integer.

In one embodiment, the second transceiver 1103 receives a third signaling and a second signal; the third signaling comprises configuration information for the second signal, the first signal comprising feedback for the second signal.

In one embodiment, the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

In one embodiment, the first transceiver 1101 comprises at least the first six of the antenna 452, the receiver/transmitter 454, the multi-antenna receiving processor 458, the receiving processor 456, the multi-antenna transmitting processor 457, the transmitting processor 468 and the controller/processor 459 in Embodiment 4.

In one embodiment, the first transmitter 1102 comprises at least the first four of the antenna 452, the transmitter 454, the multi-antenna transmitting processor 457, the transmitting processor 468 and the controller/processor 459 in Embodiment 4.

In one embodiment, the second transceiver 1103 comprises at least the first six of the antenna 452, the receiver/transmitter 454, the multi-antenna receiving processor 458, the receiving processor 456, the multi-antenna transmitting processor 457, the transmitting processor 468 and the controller/processor 459 in Embodiment 4.

Embodiment 12

Figure 12:
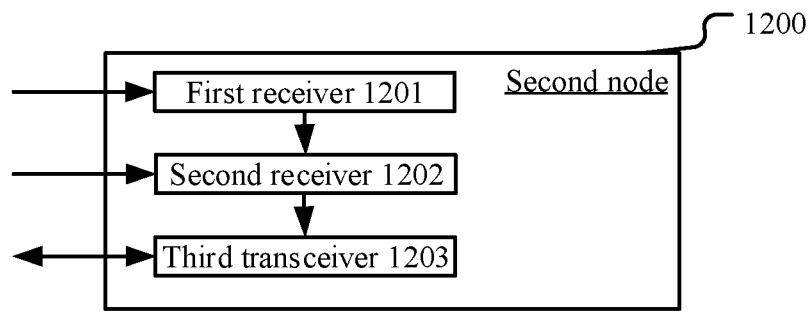
FIG. 12 illustrates a structure block diagram used in a second node according to one embodiment of the present disclosure.

Embodiment 12 illustrates a structure block diagram of a second node, as shown in FIG. 12. In FIG. 12, a second node 1200 comprises a first receiver 1201, a second receiver 1202 and a third transceiver 1203.

The first receiver 1201 receives a target signaling;
the second receiver 1202 receives a first signaling and a second signaling; and
the third transceiver 1203 receives a first signal in a first radio resource set.

In Embodiment 12, the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

In one embodiment, the target signaling is used to indicate K1 candidate reference signal(s), the target reference signal is one of the K1 candidate reference signal(s), where K1 is a positive integer.

In one embodiment, a transmitter for the first signal receives K2 first-type radio signal(s); the K2 first-type radio signal(s) is (are respectively) associated with K2 first-type reference signal(s); the target reference signal is unrelated to any one of the K2 first-type reference signal(s); the first reference signal is related to at least one of the K2 first-type reference signal(s); a transmitter for the K2 first-type radio signal(s) is a third node, the second node and the third node being non-co-located; K2 is a positive integer.

In one embodiment, the third transceiver 1203 transmits a third signaling and a second signal; the third signaling comprises configuration information for the second signal, the first signal comprising feedback for the second signal.

In one embodiment, the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

In one embodiment, the first receiver 1201 comprises at least the first four of the antenna 420, the receiver 418, the multi-antenna receiving processor 472, the receiving processor 470 and the controller/processor 475 in Embodiment 4.

In one embodiment, the second receiver 1202 comprises at least the first four of the antenna 420, the receiver 418, the multi-antenna receiving processor 472, the receiving processor 470 and the controller/processor 475 in Embodiment 4.

In one embodiment, the third transceiver 1203 comprises at least the first four of the antenna 420, the transmitter/receiver 418, the multi-antenna transmitting processor 471, the transmitting processor 416, the multi-antenna receiving processor 472, the receiving processor 470 and the controller/processor 475 in Embodiment 4.

Embodiment 13

Figure 13:
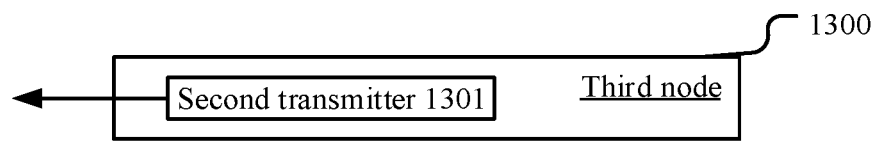
FIG. 13 illustrates a structure block diagram used in a third node according to one embodiment of the present disclosure.

Embodiment 13 illustrates a structure block diagram of a third node, as shown in FIG. 13. In FIG. 13, a third node 1300 comprises a second transmitter 1301.

The second transmitter 1301 transmits K2 first-type radio signal(s).

In Embodiment 13, the K2 first-type radio signal(s) is (are respectively) associated with K2 first-type reference signal(s); a target reference signal is unrelated to any one of the K2 first-type reference signal(s); a first reference signal is related to at least one of the K2 first-type reference signal(s); a receiver for the K2 first-type radio signal(s) includes a first node, the first node firstly transmits a target signaling, and then transmits a first signaling and second signaling, and transmits a first signal in a first radio resource set; the target signaling is used to determine the target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with the first reference signal; when the first radio resource set belongs to the second radio resource pool, the first signal is associated with the target reference signal, the target reference signal being unrelated to the first reference signal; the first signal is transmitted in sidelink; M1 and M2 are both positive integers greater than 1; a receiver for the first signal includes a second node, the second node and the third node being non-co-located; K2 is a positive integer.

In one embodiment, the target signaling is used to indicate K1 candidate reference signal(s), the target reference signal is one of the K1 candidate reference signal(s), where K1 is a positive integer.

In one embodiment, the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

In one embodiment, the second transmitter 1301 comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first transceiver, transmitting a target signaling;
   a first transmitter, transmitting a first signaling and a second signaling; and
   a second transceiver, transmitting a first signal in a first radio resource set;
   wherein the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

2. The first node according to claim 1, wherein the target signaling is used to indicate K1 candidate reference signal(s), the target reference signal is one of the K1 candidate reference signal(s), where K1 is a positive integer.

3. The first node according to claim 2, wherein the first transceiver receives K2 first-type radio signal(s); the K2 first-type radio signal(s) is (are respectively) associated with K2 first-type reference signal(s); the target reference signal is unrelated to any of the K2 first-type reference signal(s); the first reference signal is related to at least one of the K2 first-type reference signal(s); a receiver for the first signal includes a second node, a transmitter for the K2 first-type radio signal(s) is a third node, the second node and the third node being non-co-located; K2 is a positive integer.

4. The first node according to claim 1, wherein the second transceiver receives a third signaling and a second signal; the third signaling comprises configuration information for the second signal, the first signal comprising feedback for the second signal.

5. The first node according to claim 1, wherein the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

6. The first node according to claim 1, wherein the phrase that the first signal is associated with a first reference signal means that the first signal and the first reference signal are Quasi Co-located (QCL).

7. The first node according to claim 1, wherein the phrase that the first signal is associated with a target reference signal means that the first signal and the target reference signal are QCL.

8. The first node according to claim 1, wherein the phrase of the target reference signal being unrelated to the first reference signal means that the target reference signal and the first reference signal are non-QCL.

9. The first node according to claim 1, wherein the first node comprises a first panel and a second panel, the first panel being associated with the first reference signal, the second panel being associated with the target reference signal.

10. The first node according to claim 9, wherein the first panel is associated with X1 antenna ports, a first antenna port being one of the X1 antenna ports, where X1 is a positive integer, the first reference signal employs the first antenna port to transmit.

11. The first node according to claim 9, wherein the second panel is associated with X2 antenna ports, the target antenna port being one of the X2 antenna ports, where X2 is a positive integer, the target reference signal employs the target antenna port to transmit.

12. The first node according to claim 9, wherein a first index and a second index respectively correspond to the first panel and the second panel in the present disclosure; when the first signal is associated with the first reference signal, the first index is used to generate the first signal; when the first signal is associated with the target reference signal, the second index is used to generate the first signal.

13. The first node according to claim 1, wherein the target reference signal is transmitted in sidelink, while the first signaling and the second signaling are both transmitted in sidelink.

14. A second node for wireless communications, comprising:
a first receiver, receiving a target signaling;
a second receiver, receiving a first signaling and a second signaling; and
a third transceiver, receiving a first signal in a first radio resource set;
wherein the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

15. The second node according to claim 14, wherein the target signaling is used to indicate K1 candidate reference signal(s), the target reference signal is one of the K1 candidate reference signal(s), where K1 is a positive integer.

16. The second node according to claim 15, wherein a transmitter for the first signal receives K2 first-type radio signal(s); the K2 first-type radio signal(s) is (are respectively) associated with K2 first-type reference signal(s); the target reference signal is unrelated to any of the K2 first-type reference signal(s); the first reference signal is related to at least one of the K2 first-type reference signal(s); a transmitter for the K2 first-type radio signal(s) is a third node, the second node and the third node being non-co-located; K2 is a positive integer.

17. The second node according to claim 14, wherein the third transceiver transmits a third signaling and a second signal; the third signaling comprises configuration information for the second signal, the first signal comprising feedback for the second signal.

18. The second node according to claim 14, wherein the first type means that a corresponding multicarrier symbol can be used for an uplink transmission in a cellular link; the type other than the first type includes at least one of a second type or a third type, the second type meaning that a corresponding multicarrier symbol can be used for a downlink transmission in a cellular link, while the third type meaning that a corresponding multicarrier symbol can be used for a downlink or uplink transmission in a cellular link.

19. A method in a first node for wireless communications, comprising:
transmitting a target signaling;
transmitting a first signaling and a second signaling; and
transmitting a first signal in a first radio resource set;
wherein the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

20. A method in a second node for wireless communications, comprising:
receiving a target signaling;
receiving a first signaling and a second signaling; and
receiving a first signal in a first radio resource set;
wherein the target signaling is used to determine a target reference signal; the first signaling and the second signaling are respectively used to indicate a first radio resource pool and a second radio resource pool; the first radio resource pool comprises M1 multicarrier symbols, any of the M1 multicarrier symbols being of a first type; the second radio resource pool comprises M2 multicarrier symbols, there is at least one multicarrier symbol among the M2 multicarrier symbols being of a type other than the first type; when the first radio resource set belongs to the first radio resource pool, the first signal is associated with a first reference signal; when the first radio resource set belongs to the second radio resource pool, the first signal is associated with a target reference signal, the target reference signal being unrelated to the first reference signal; the first signal is transmitted in sidelink; M1 and M2 are both positive integers greater than 1.

* * * * *